United States Patent [19]

Shaw et al.

[11] Patent Number: 5,024,299
[45] Date of Patent: Jun. 18, 1991

[54] ELECTRIC DRUM BRAKE

[75] Inventors: Schuyler S. Shaw, Dayton; Linda L. Hallinan, Centerville, both of Ohio; Robert J. Hammersmith, Rochester Hills, Mich.; Donald E. Schenk, Vandalia, Ohio; Edward J. DeHoff, Huber Heights, Ohio; Alexander Kade, Grosse Pointe Woods, Mich.

[73] Assignee: General Motors Corporation, Detroit, Mich.

[21] Appl. No.: 525,386

[22] Filed: May 18, 1990

Related U.S. Application Data

[63] Continuation of Ser. No. 353,120, May 17, 1990.

[51] Int. Cl.⁵ ............................................. F16D 65/27
[52] U.S. Cl. .................................. 188/156; 188/79.51; 188/162; 188/328
[58] Field of Search .............. 188/156, 157, 162, 328, 188/325, 326, 331, 196 R, 196 F, 196 M, 196 D, 151 R, 72.4, 72.7, 71.7, 71.8, 71.9, 72.8, 79.51, 79.56

[56] References Cited

U.S. PATENT DOCUMENTS

| | | | |
|---|---|---|---|
| 4,762,209 | 8/1988 | Copp | 188/328 |
| 4,784,244 | 11/1988 | Carre et al. | 188/156 |
| 4,795,002 | 1/1989 | Burgei et al. | 188/156 |
| 4,850,459 | 7/1989 | Johannsen et al. | 188/156 |

Primary Examiner—Matthew C. Graham
Attorney, Agent, or Firm—Ernest E. Helms

[57] ABSTRACT

An automotive vehicle drum brake including a brake drum for connected to the vehicle wheel and a backing plate for connected to the vehicle. At least one brake shoe is and pivotally mounted with respect to the backing plate. A non-rotative nut mounted for linear motion with respect to said backing plate and has a pivotal connection with the brake shoe. A power screw is threadably engaged with the nut. An electric motor powers the power screw to turn the same to actuate the brakes. A parking brake mechanism is also provided by a coil spring which surrounds a drum which is connected with the power train from and including the electrical motor and the power screw. An actuator is provided to move the coil spring to an unwound position to allow the parking brake to release.

8 Claims, 7 Drawing Sheets

ELECTRIC DRUM BRAKE

FIELD OF THE INVENTION

This is a continuation in part of copending U.S. Pat. Application No. 07/353,120 filed May 17, 1990.

The field of the present invention is that of electrically actuated drum automotive brakes. More particularly the field of the present invention is that of automotive drum brakes having a parking brake.

SUMMARY OF THE INVENTION

The present invention provides an electrically actuated braking mechanism which can be utilized as the primary brake or as a parking brake and furthermore provides the braking mechanism with a mechanical parking brake which is non-dependent upon electrical actuation to maintain the car in the braked condition.

Other objects and advantages of the present invention can become more apparent to those skilled in the art as the nature of the invention is better understood from the accompanying drawings and a detailed description.

BRIEF DESCRIPTION OF THE DRAWINGS

FIGS. 2, 3, 5, 6 and 7 are taken along lines 2—2, 3—3, 5—5, 6—6 and 7—7 respectively of FIG. 1;

DETAILED DESCRIPTION OF THE DRAWINGS

Figure 1:
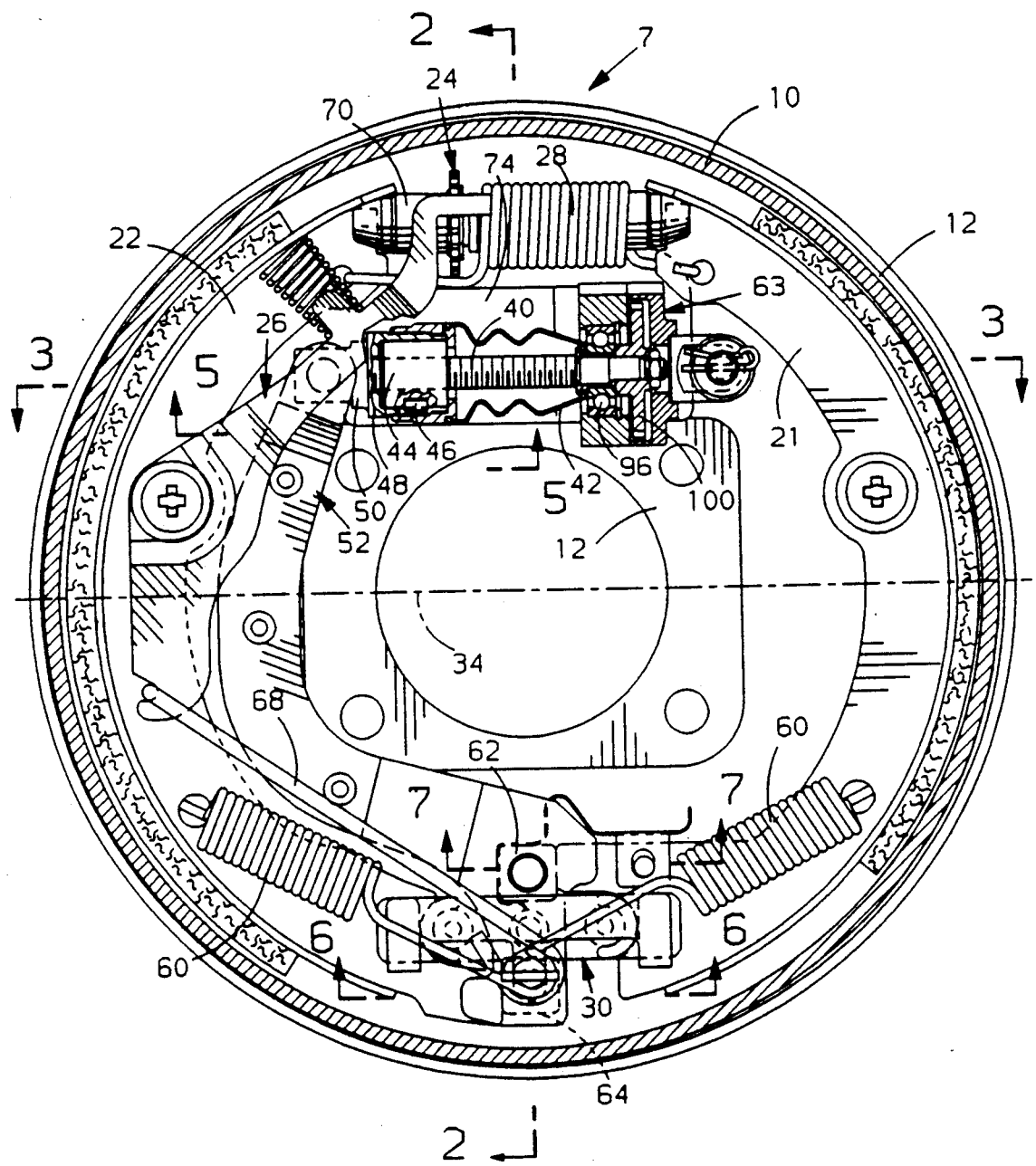
FIG. 1 is a front elevational view of a preferred embodiment brake of the present invention.
Figure 2:
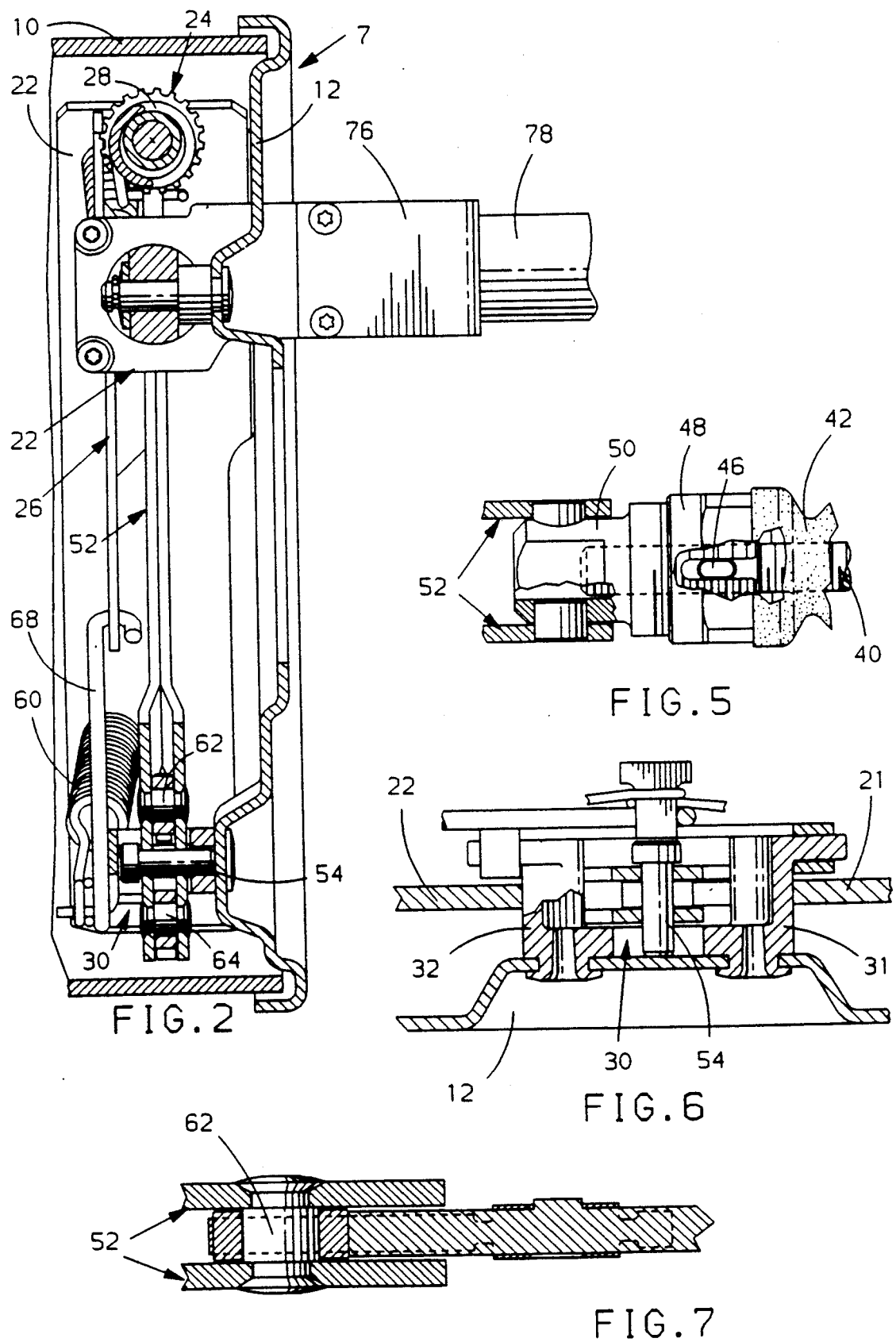
Figure 3:
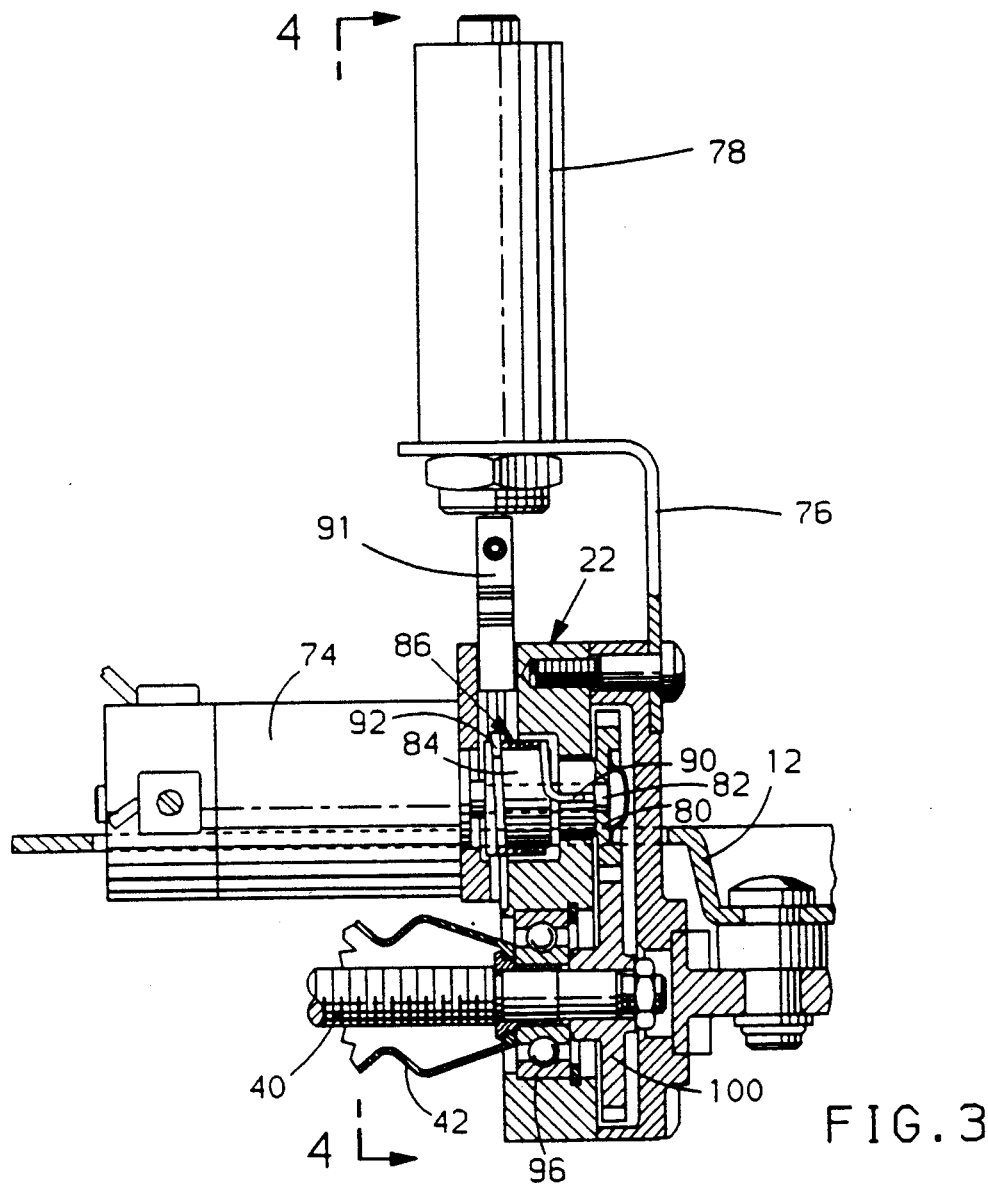
Figure 4:
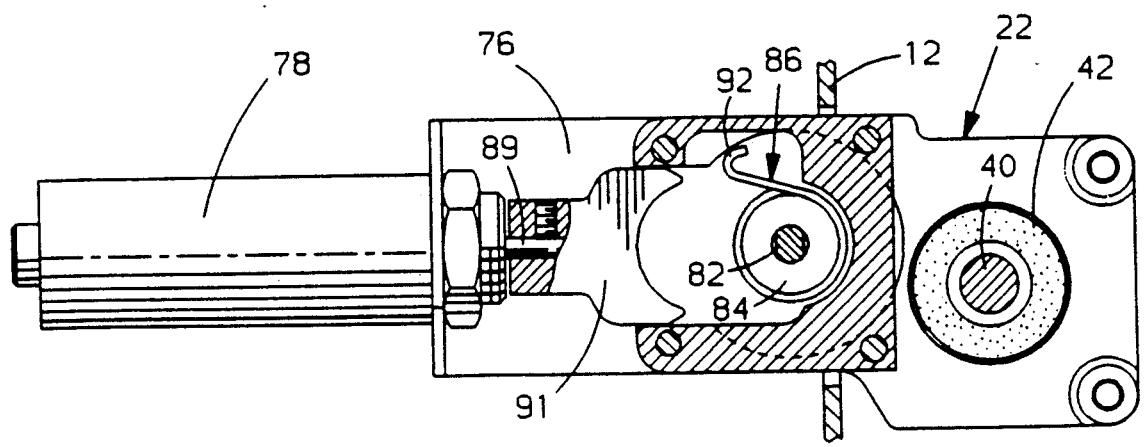
FIG. 4 is a view taken along line 4—4 of FIG. 3.

Referring to FIGS. 1-7 the drum brake assembly 7 of the present invention has a conventional brake drum 10 (an outline of which is shown) which is provided for connection to the vehicle wheel. Mounted to the vehicle is the backing plate 12 traditionally mounted to the axial housing. Mounted by a spring loaded pin to bias them towards the mounting plate are secondary 22 and primary 21 shoes. The spacing between the primary and secondary screws is adjustably set by a screw and starwheel type adjuster 24 which is acted upon by a pawl 26 which is also pivotally connected with the backing plate 12. A spring 28 holds the primary 21 and secondary 22 shoes together on the top and surrounds the adjuster 24. At their lower ends the primary 21 and secondary 22 shoes contact an anchor 30 with pins 31 and 32 which is fixed with respect to the backing plate 12. During actuation the primary and secondary shoes split apart from one another away from the bottom anchor 30. A line 34 bisecting the brake assembly 7 will separate the anchor 30 from the adjuster 24. Rotatively mounted to the backing plate in position by a bearing 96 is a power screw. The power screw is covered by a boot 42 and is threadably engaged with a non-rotative nut 44. The nut is keyed at 46 into a frame 48 to prevent its rotation. The frame 48 has an extension 50 (FIG. 5) which is pivotally connected to an apply lever 52. The apply lever 52 is of the shape of a bent arm and has a loss motion pivotal connection with the backing plate intermediate the two anchors pins 32 and 31 for the primary and secondary shoes via a pin.

Each brake shoe has a return spring 60 urging that shoe towards the anchor 30. The apply lever 52 has pivotal movement with respect to the shoes 21, 22 by the shoe actuators 62, 64 which contact portions of the shoes. Movement of the non-rotative nut 44 to the right, as shown in the drawings, will cause the lever 52 to rotate clockwise causing the shoes 21, 22 to be contacted and separated in an outward direction. The return spring 60 will cause the shoes to return to the non-actuated position. The adjuster 24 screw acted upon by the adjuster pawl 26 lever which is held by an adjuster pawl link 68 and will turn the adjuster nut 70 upon actuation of the wheel brake 7. A frame 63 is provided which mounts a power train electrical motor 74 to the backing plate 12. An extension 76 of that frame mounts a mechanical hydraulic or thermal actuator 78. A pinion 86 of a gear train is connected to the shaft (rotor) of the motor 74. Motor 74 powers the drive screw via gears 80 and 100. Connected to the motor shaft 82 is the parking brake drum 84. Surrounding the parking brake drum is a coil spring 86 which has one end 90 which is generally grounded. The spring 86 is configured in such manner that rotation of the motor in a direction to release the brake to the non-activated position will cause the motor drum 84 to wrap in the spring 86 and be restrained from rotation. Therefore, once activated the brake shoes 21,22 remain activated. To allow the relief of the activation of the brake shoes 21, 22 there is a linear actuator rod 89 with a hand 91 operatively associated with the free end 92 of the spring. (In an alternative embodiment not shown a non-linear actuator can be utilized.) Extention of rod 89 make hand 91 contact the free end 92 of the coil spring 86, moving the pins to an unwinding position, therefore allowing free motion of the motor 74. The actuator 78 is usually an electrical (solenoid or small motor) or a hydraulic powered actuator. It can also be a thermal actuator which uses a ceramic heater to heat a substance which impacts upon a diaphragm connected with the rod. Typically, the actuator 78 will be a bi-stable actuator that can remain in an extended position without a continual drain of current. Therefore in normal operation of the vehicle spring 86 is held in an unwound position without electric current in the actuator 78.

Figure 8:
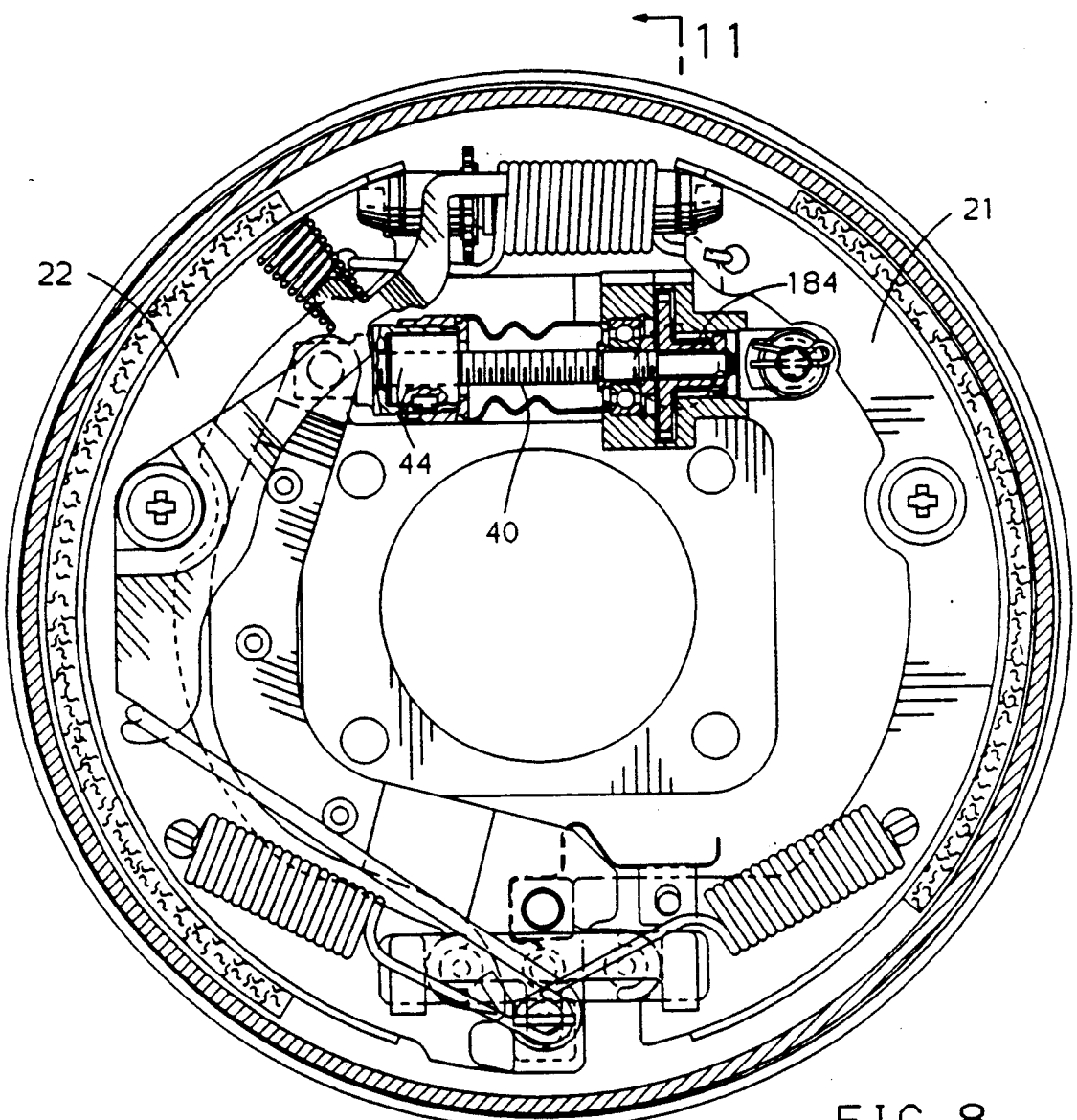
FIGS. 8 and 9 are sectional views shown mainly in front elevation of alternative embodiments of the present invention.
Figure 10:
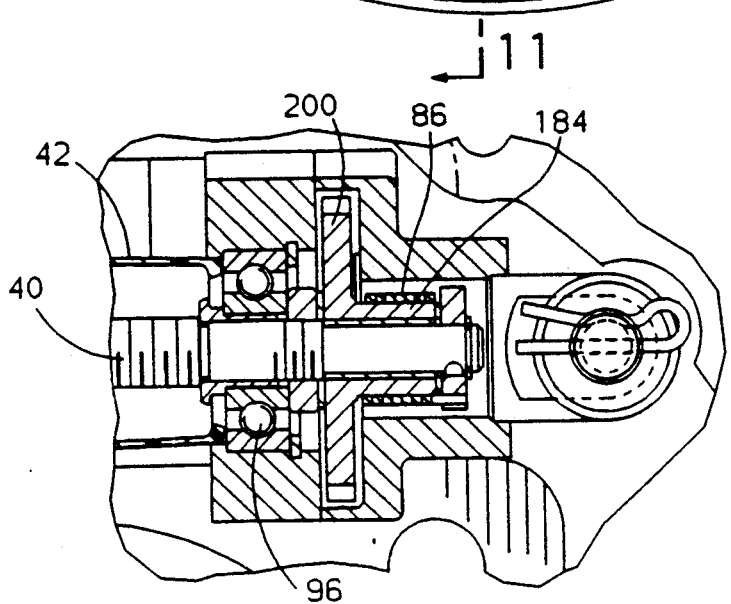
FIG. 10 is an enlargement of a portion of FIG. 8.
Figure 11:
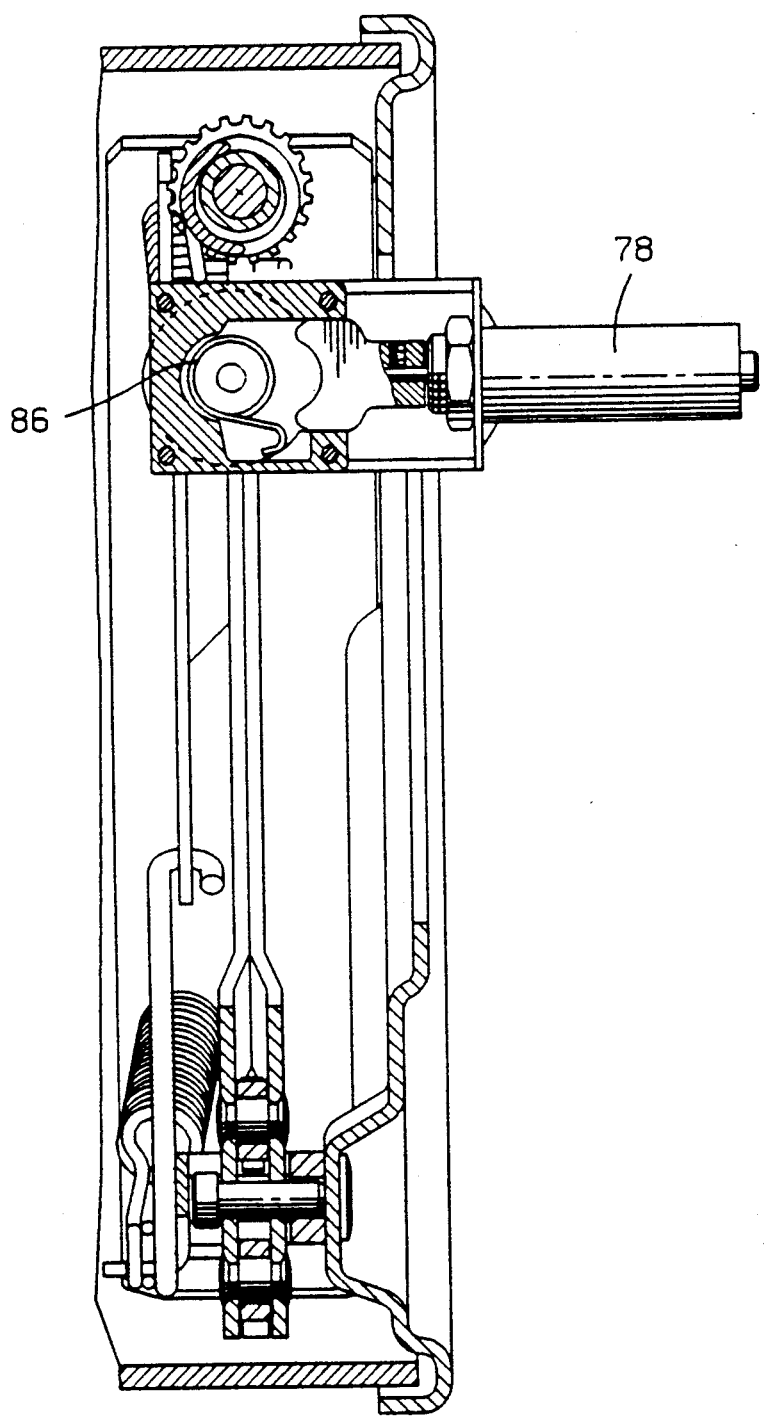
FIGS. 11 and 12 are taken along lines 11—11 and 12—12 of FIGS. 8 and 9 respectively.
Figure 12:
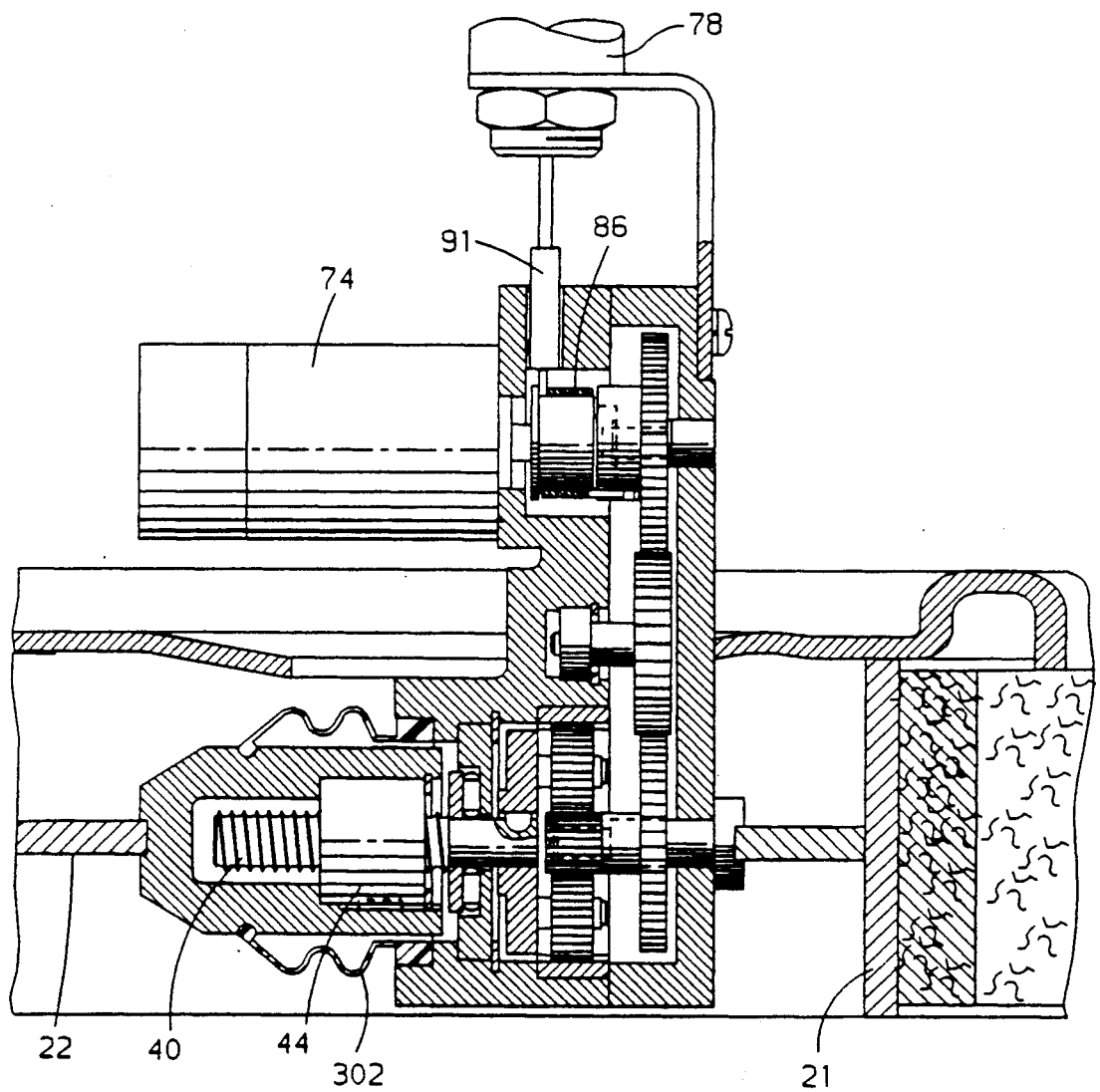

Referring to FIGS. 8, 10 and 11 (items performing the same functions are given similar reference numerals) the drum 184 has been relocated to an extension 184 of the pinion gear 200 which is in turn keyed to the power screw 40. Therefore, the drum 84 located on the motor shaft can be eliminated and the coil spring 86 and linear actuator 78 are relocated accordingly.

Figure 9:
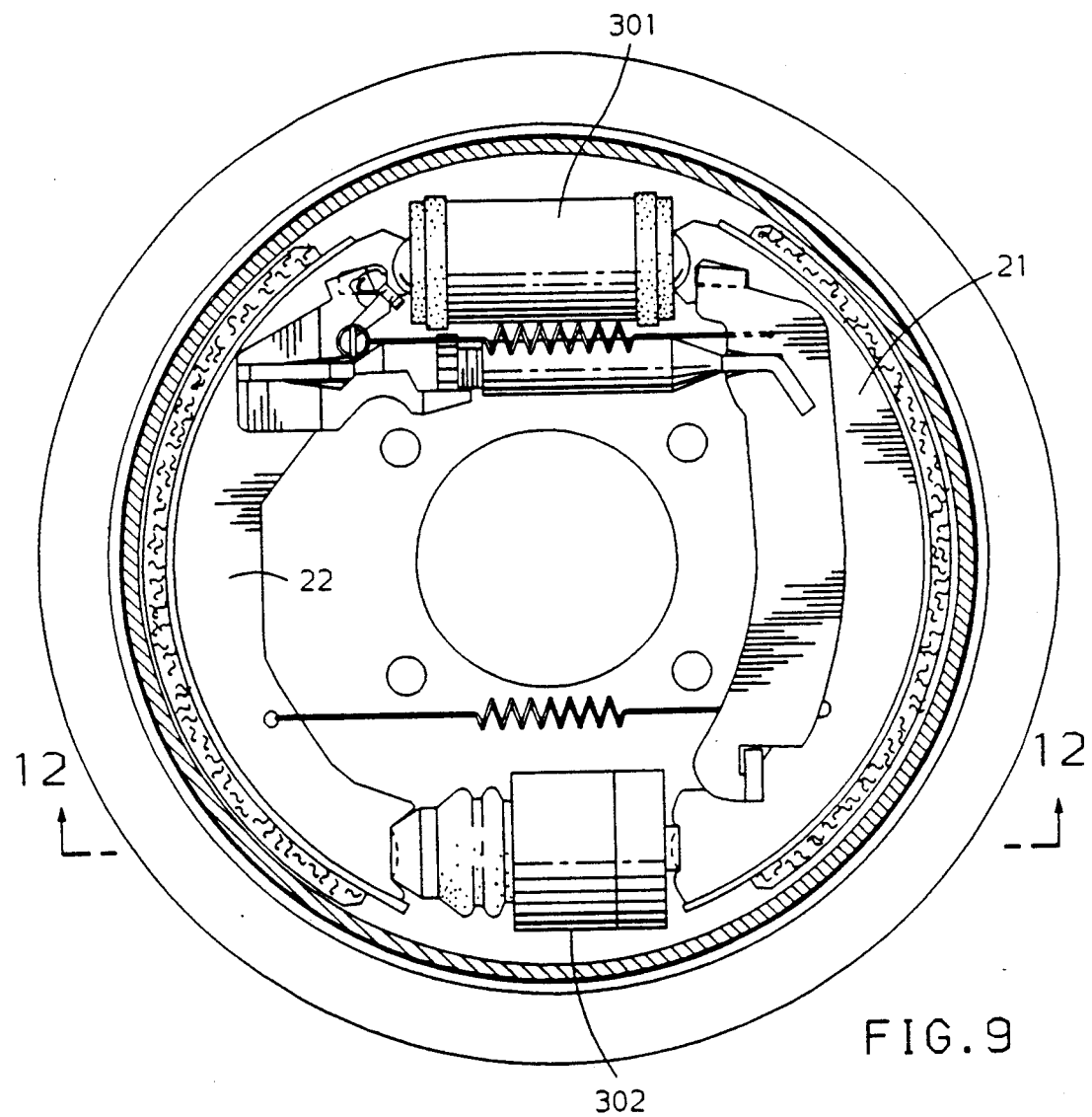

Referring to FIGS. 9 and 11 a dual braking actuator type brake is provided. The drum brake of FIG. 10 has a conventional hydraulic cylinder 301 braking actuator. The electrically actuated braking actuator 302 provides an anchor for the brake shoes in normal operation and additionally acts as the parking brake and emergency brake. The braking actuator 302 can also act as an adjuster mechanism if so programmed by a controller. In normal operation the hydraulic cylinder 301 is actuated. For the parking brake actuation the electrical braking actuator 302 will operate as previously disclosed. For space considerations the linear actuator 78 can be mounted in a vertical position rather than the horizontal position shown.

While various embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. An automotive vehicle drum brake comprising:
   a brake drum for connection to said wheel;
   a backing plate for connection to said vehicle;
   at least one brake shoe connected with said backing plate and pivotally mounted with respect thereto;
   at least one braking actuator including:
   a non-rotative nut mounted for linear motion with respect to said backing plate and having means of pivotal connection with said brake shoe;
   a power train including:
      a power screw threadably engaged with said nut, said power screw being mounted to said plate; and
      an electric motor with a shaft torsionally connected with said power screw to turn the same to actuate said brakes;
   a drum connected with said power train;
   a coil spring surrounding said drum and said spring being grounded at one end, and wherein activation of said motor in a direction to release said brake causes said drum to wind said spring and be restrained from rotation by said spring; and
   an actuator operatively associated with another end of said spring for moving said spring into a position generally unwinding said spring and restraining said spring from engagement with said drum.

2. A drum brake as described in claim 1 wherein said actuator is a linear actuator.

3. A drum brake as described in claim 1 wherein said actuator is powered by fluid.

4. A drum brake as described in claim 1 wherein said actuator is a thermo actuator.

5. A drum brake as described in claim 1 wherein said actuator is an electrical actuator 6. A drum brake as described in claim 5 wherein said electrical actuator is a solenoid.

7. A drum brake as described in claim 1 wherein there is another mechanical fluid powered braking actuator.

8. A drum brake as described in claim 1 wherein said drum is mounted on said power screw.

* * * * *